(12) United States Patent
Strizhevskiy

(10) Patent No.: US 6,927,333 B2
(45) Date of Patent: Aug. 9, 2005

(54) TWIN-WIRE LINE

(75) Inventor: Naum Strizhevskiy, Verona, NJ (US)

(73) Assignee: T. Bogomolny, Morris Plains, NJ (US)

( * ) Notice: Subject to any disclaimer, the term of this patent is extended or adjusted under 35 U.S.C. 154(b) by 0 days.

(21) Appl. No.: 10/177,927

(22) Filed: Jun. 22, 2002

(65) Prior Publication Data

US 2003/0234113 A1 Dec. 25, 2003

(51) Int. Cl.$^7$ .................................................. H01B 11/02
(52) U.S. Cl. ........................................................ 174/33
(58) Field of Search ............................ 174/32, 33, 36; 336/1, 12

(56) References Cited

U.S. PATENT DOCUMENTS

| | | | | | |
|---|---|---|---|---|---|
| 4,939,315 | A | * | 7/1990 | Palmer ........................ | 174/36 |
| 5,064,966 | A | * | 11/1991 | Palmer ........................ | 174/32 |
| 5,113,159 | A | * | 5/1992 | Adriaenssens et al. ........ | 333/12 |

* cited by examiner

*Primary Examiner*—Chau N. Nguyen
(74) *Attorney, Agent, or Firm*—I. Zborovsky

(57) ABSTRACT

A twin-wire line over (un)shielded (un)twisted pair for simplex and duplex analog and digital single- and multi-span single- and multi-channel local and long-distance cable communications comprising on every improved span the repeatedly in turn grounded pair wires at first the one wire, than the other wire etc. again the next from the pair wires are with the step length between said grounds are roughly and more of a fourth of the wave length of the low-frequency rate of the passband, and at least neither more than one time so grounded each pair wire of an improved span to increase several times the passband, span length, reduce the quantity of equipment and number of spans, improve, simplify and reduce cost of them and cable communications by means of reduce the currently in force passband attenuation per unit length of an existing pair of the existing/laying cables below of the universally known rated its self-value, reduced by means of the introduced parallel signal transmitting both as usual directly over the existing pair wires and in bypass over the same wires of the same pair and the ground return path accomplish as the external (frame) grounds, an AC network, a pair shield, and even a metallic cable sheath.

9 Claims, 3 Drawing Sheets

US 6,927,333 B2

TWIN-WIRE LINE

BACKGROUND OF THE INVENTION

The present invention related to simplex and (half-)duplex analog and digital single- and multi-span single- and multi-channel local and long-distance cable communications over (un)shielded (un)twisted pair for transmission of data, telephone, television, internet, and other coded/modulated/any signals.

The twin-wire lines over (un)shielded (un)twisted pair—the most common type of transmission media—is universally known [Newton's, "Telecom dictionary", 15$^{th}$ edition, pp. 709, 823, 835]. In general the twin-wire lines over unshielded twisted pair is the only type of all subscriber lines of all cable communications.

The most nearest by a technical essence is the universally known twin-wire line over (un)shielded (un)twisted pair with the load-networks connected the pair end(s) of span(s) of cable communications directly by a simplex and via a hybrid [ibid, p. 387] by a duplex to the in/out stage/s of the line equalizers [ibid, p. 283], repeaters [ibid, p. 662], regenerators [ibid, p. 657], and any equipment, selected from the group consisting of the load-matching networks [ibid, p. 793] and the load-reflecting equalizers [N. Strizhevskiy, "Method of and devices for telecommunications", Patent No.: U.S. Pat. No. 6,381,284 B1, April 2002].

In the universally known existing/laying twin-wire lines the (un)shielded (un)twisted pair matched at the pair span ends by said load-matching networks currently bring in, while the connected by it an equalization matched equipment currently equalized the currently in force excessive great passband span attenuation, that now equal not lesser of the known rated self-attenuation of this pair. Currently, the line/span length, its passband, transmission speed, carrying capacity, etc. is limited by the necessity of the equalization of this excessive great self-attenuation of an existing (un)shielded (un)twisted pair of the twin-wire lines over the existing/laying cables.

Thanks to the new use of laws of nature, said load-reflecting equalizers thus the adapt mismatching of the pair end(s) bring into use the uselessly losing signal energy and elevated the efficiency of an equipment connected by its. Without of the re- and new-cabling, while only by means of said improvement realized by said load-reflecting equalizers connected an equipment input stage to the pair end the passband span attenuation of an existing pair on an improved span of the existing/laying cables is on 6 dB lesser of the currently in force universally known rated self-value, and besides that directly between each from the pair ends and connected to each the equipment in/out stage(s) in sum at both pair ends is entered the extremely passband span equalization/amplification some more 20–30 dB, and total one by one on every improved span on top of the currently in force universally known rated self-values of the passband span equalization without of adding an equalizing amplifiers, noises, and interference it is first in addition entered the extremely equalization 25–35 dB. By currently in force the passband span equalization equal 60, 30, or 15 dB entered of an existing line equipment by adding to it of said extremely equalization it is extremely one by one at each from so an improved span of an improved line, respectively:

augments the upper-frequency reach of a span passband by 2, 4, or 9 times; or extends the equalized pair span length/attenuation reach by 1.5, 2, or 3 times; or in compromise augments/extends both its passband, and its length reaches.

Besides that in comparison with a simplex in a duplex twin-wire line by a hybrid converted into two the one-way paths it is necessary twice more of an excessive equipment for the equalization one by one in each direction the same currently in force excessive great passband span self-attenuation of an (un)shielded (un)twisted pair of each twin-wire line span over the existing/laying cables, and that is some more excessive by said usual load-matching networks than that by said load-reflecting equalizers entered said extremely equalization.

However, this all now-known means in generally is insufficiently for the following increasing the twin-pair line passband, span length, etc. accordingly of an object of the present invention without adding of an active line equalization equipment now necessary by the currently in force excessive great now-known pair span passband attenuation.

SUMMARY OF THE INVENTION

Accordingly, it is an object of the present invention to increase the passband, transmission speed, carrying capacity, span length, to using the thinnest wire gauge, to reduce the quantity of equipment and the number of spans, and/or to improve, simplify and reduce cost of them and the cable communications by means of reduce the currently in force passband attenuation per unit length of an existing pair of the existing/laying cables below of the universally known rated self-value.

In keeping with these object and with others which will become apparent hereinafter, said line comprising:

(a) one by one on every improved span the one pair wire grounded at the one end of an improved span, and the other pair wire grounded at the opposite span end, and wherein at each said pair span end connected to it said equipment in/out stage(s) formed accomplish one as:

(b) the symmetrical differential in/out stage(s) insulated from the ground;

(c) the coaxial in/out stage(s) with its outer terminal connected to said grounded pair wire end (a);

(d) the asymmetrical in/out (c) galvanic insulated from the ground.

In order to the transmission from the zero-length said improved span at both ends comprising the ground networks selected from the group consisting of:

(e) a ground cutout switch series to said grounded pair wire (a) manual/automatic (dis)connected and adapted; and (f) an adapting ground network series to said grounded pair wire (a) formed as series capacitors shunted by the resistor(s) and R-C circuit(s); and wherein said equipment in/out connected to said pair ends (a) with said ground networks (e), (f) formed as symmetrical (b).

For suppressing the hum and low-frequency interference of the ground currents, said improved span comprising the circuits selected from the group consisting of:

(g) an insulating line transformer at the protected pair span end(s);

(h) an antihum capacitor series to protected said pair wire(s) (a) of protected said improved span (connected at the middle/part/end of the insulating line coil of said transformer (g));

(i) a blocking capacitor series to said introduced ground to said grounded pair wire end(s) (a) and said equipment in/out connected to it grounded wire end formed as (a)symmetrical (d), (b); and (j) a shield of said improved span connected said grounded pair wire ends (a) between the span ends, galvanic insulated from ground along said span and at the given span end, and grounded at the opposite span end only, and said equipment in/out connected at this galvanic insulated span end formed as (a)symmetrical (d), (b).

By perforce, said improved span comprising the circuits selected from the group consisting of:
(k) an external ground (a) as the ground of the AC network (power plug);
(l) an external ground (a) as the power wire(s) of the AC network (power plug) connected by the insulating capacitor(s);
(m) a galvanic insulated/grounded pair shield connected/grounded said grounded pair wire ends (a) between/at said improved span ends;
(n) a shield (j), (m) grounded at said galvanic insulated span end by a blocking capacitor (i);
(o) a metallic cable sheath of the sheathed improved span grounded/insulated/connected as said shield (j), (m), (n), (t), (w) in parallel to/instead of said shield;
(p) a leakage/balancing resistor connected between the ground and said pair wire end(s) (a) at said improved span end/s; and
(q) a low-frequency matching load with the impedance equal to an increment of the characteristic impedance of said improved pair span at low-frequencies series to said load-matching network and said load-reflecting equalizer and formed as series resistors shunted by the capacitor(s) and R-C circuit(s).

For the remote power supply, ring, call, and control said improved span at end(s) comprising said insulating line transformer(s) (g) and blocking capacitor(s) (i), and the primary power supply/transmitter of remote power, ring, call, and control at the one span end is connected to the secondary power supply/their receiver at the opposite span ends over said pair accomplish one of:
(r) at each span end between said here grounded galvanic insulated pair wire end (a) and the insulating line coil of said transformer (g) series to this wire end;
between said parallel connected span paths selected from the group consisting of said ground span path, pair shield (m), (n), cable sheath (o), and an identical circuits of an other identical line of this span and accomplish one of:
(s) said pair wire ends (a) grounded galvanic insulated at the given and opposite span ends with said transformer (g) are at the one/both span end(s);
(t) as well (s), with said grounded galvanic insulated pair wire ends (a) connected by shield (j) between span ends are with(out) said transformer(s) (g);
(u) both said grounded galvanic insulated pair wire end (a) at given span end and the grounded galvanic insulated end of the insulating line coil of said transformer (g) at opposite span end;
(v) as well (u), over said other pair wire (a);
(w) the ends of said galvanic insulated pair shield only; and
(x) as well (r),–(w), in series/parallel to the identical paths of other line span(s).

Finally, said introduced passive component(s) and circuit (s) selected from the group consisting of (a),–(x) formed as the twin-wire line/span length/passband expand connector—a separate unit connected at both ends of an improved span at each between an existing line equipment and connected to it an existing pair of an existing/laying cable.

In generally, twin-wire line over (un)shielded (un)twisted pair comprising:
(y) the repeatedly in turn grounded pair wires at first the one wire, than the other wire, etc. along the improved span(s) in turn again grounded the next from the pair wires and so grounded at least neither more than one time each pair wire are with the ground step roughly and more of a fourth of the wavelength of the rated lower cutoff frequency of the passband; and
(z) said ground, adapting, protection, and remote phantom circuit(s)/path(s) selected from the group consisting of (b),–(x).

For the guided adaptive equalization of the systems' linear distortions of any pair of the different length and any shape, type, size/gauge of any cable type, category and what it is made of, said line equipment comprising the direct coupling/negative feedback consisting of the manual/automatic guided adaptive equalizing two-pole network formed as a row of the parallel equalization level control potentiometers shunted by the fixed/variable/switched parallel/series R-L-C circuit(s), and each potentiometer connected accomplish one with:
(aa) the one leg, shunted by the fixed/variable/switched series R-C circuit;
(ab) the one leg, shunted by the fixed/variable/switched series R-L circuit,
(ac) the one leg of said potentiometer $R_E$, shunted as well (aa), while the other leg as well (ab), and $L=(R+R_E/2)^2C$; and
(ad) the leg(s), shunted by the fixed/variable/switched parallel/series R-L-C circuit(s).

The novel features which are considered as characteristic for the present invention are set forth in particular in the appended claims. The invention itself, however, both as to its construction, and as to its principle of operation, together with additional objects and advantages thereof, will be best understood from the following description of specific embodiments when read in connection with th accompanying drawings.

Figure 1:
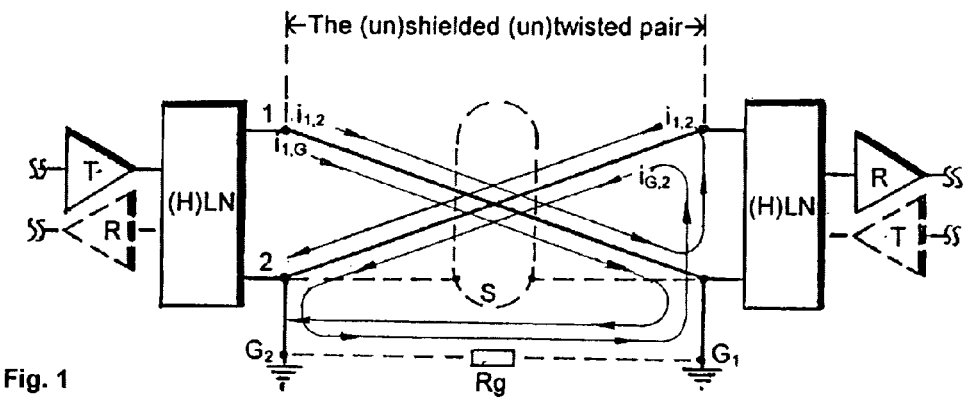
FIG. 1 is a block diagram of the twin-wire line span of the present invention.

The symbol which are used in drawing are as follows:

| | |
|---|---|
| 1, 2 = | is the one and the other pair wires, respectively; |
| $a_{Rc/RL}$ = | is a quantity of the equalizing RC/RL-branches; |
| $Ca_1$, $Ca_2$ = | is the antihum capacitors of the one 1 and the other 2 pair wires, respectively; |
| Cb = | is a blocking capacitor; |
| $G_1$, $G_2$ = | is the grounds of the one 1 and the other 2 pair wires, respectively; |
| (H) LN = | is a Load-Network selected from the group consisting of the a load-matching network and load-reflecting equalizer connected to the pair span end directly by a simplex and via a Hybrid by a duplex; |
| $m_{RLC}$ = | is a quantity of the equalizing RLC-branches; |
| $n_{RL}$ = | is a quantity of the equalizing RL-branches; |
| R = | is a receive equipment as the equalizer, repeater, regenerator; |
| R, L, C = | is the resistance, inductance, and capacitance of the fixed/switched resistor, inductor, and capacitor of the equalizing circuits respectively; |
| $R_E$ = | is an potentiometer of an equalization level control; |
| Rg = | is a total resistance of the ground span return path $G_1$–$G_2$; |
| $Rl_1$, $Rl_2$ = | is the leakage/balancing resistors at pair span end(s); |
| Rr, $Rr_1$, $Rr_2$ = | is a secondary power supply/receiver of the phantom paths and over the wires 1, 2, in particular; |
| S = | is a pair shield/metallic cable sheath; |
| $Sg_1$, $Sg_2$ = | is the ground cutout switches of the grounds $G_1$, $G_2$, respectively; |
| T = | is a transmit equipment as the pre-equalizer, repeater, regenerator; |
| Ti = | is an insulating line transformer; |
| Ug = | is a ground-potential difference; |
| Ur, $Ur_1$, $Ur_2$ = | is a primary power supply/transmitter of the phantom paths and over the wires 1, 2, in particular; |
| $U_{RC}$ = | is a quantity of the equalizing RC-branches; |
| $Za_1$, $Za_2$ = | is an adapting ground networks of the one 1 and the other 2 pair wires, respectively; and |
| $Z_E$ = | is a guided adaptive equalizing two-pole network of any pair of the different length of any shape, type, size/gauge of any cable type, category and what it is made of. |

The signal current directions for the one direction of the simplex/duplex transmission are showed in drawing are as follows:

| | |
|---|---|
| $i_{1,2}$ = | is a current over the pair wires 1 and 2 of the direct span path; |
| $i_{1,G}$ = | is a current in the transmit direction over the wire 1 and ground span return path $G_1$–$G_2$ in the one half of the bypass span path; and |
| $i_{G,2}$ = | is a current in the receive direction over the ground span return path $G_2$–$G_1$ from the wire 2 in the other half of the bypass span path. |

DESCRIPTION OF PREFERRED EMBODIMENTS

The twin-wire line with the present invention is formed and run in the following manner.

To achieve the objective of present invention in the proposed twin-wire line spans by means of the introduced grounds $G_1$, $G_2$, respectively the one wire 1 at the one end of the (un)shielded (un)twisted pair span, and the other wire 2 at the apposite pair span end (FIG. 1), the signal is first simplex/(half-)duplex passed in parallel both as usual directly over the existing pair wires 1, 2 and in the bypass over the same wires 1, 2 of the same pair and the ground return path $G_1$–$G_2$.

By the zero-length of the improved span(s) the proposed line is short-circuited by the grounds $G_1$ of the one wire 1 and $G_2$ of the other wire 2 entered at the apposite span ends. The transmission started with the wave-process making with the span(s) length and signal(s) frequencies growing. By the span length more than 5,000–10,000 feet (1.5–3 km) the lower cutoff frequency rate of the passband it is roughly 25–50 kHz. By the passband span attenuation 20 dB and any much more the proposed line span(s) is practical infinite* and in the direct span path independently from the introduced wire grounding one by one at the apposite span ends of an existing pair is introduced as usually the known rated passband attenuation per unit length directly.

*It is infinite since already by the pair span attenuation ≧20 dB the echo-signals at any pair end after the full-reflecting at both the given and back at the apposite pair ends after the twice travel there and back between the pair ends has twice attenuated by ≧2×20=40 dB and be ≧100 times as lesser than that the useful transmitted signal(s) and are practical absent and not detected.

Along the improved line/span(s) the one half of the bypass span path: a transmit equipment T over the load-network/equalizer (H)LN, the one wire 1, and the ground return path $G_1$–$G_2$ of the apposite/given pair ends, and the other half of the bypass span path: the other wire 2, the ground return path $G_2$–$G_1$ of the given/apposite pair ends, and the load-network/equalizer (H)LN to a receive equipment R it is linked by the distributed capacitance and mutual induction between wires 1, 2, and by the general wave-process between this wires, and the mutual induction linked wires 1, 2 of said pair with the transformation ratio 1 either shunted each other along the span by the induced equal they resistance. Over said one half of the bypass span path the signal is transmitted at the given span end, while over said other half is received at apposite span end.

Along the improved line/span(s) the current direction $i_{1,G}$ of the signal from a transmit equipment T over said load-network/equalizer (H)LN, said wire 1 and said ground return path $G_1$–$G_2$ at the apposite/given pair ends is coincided with the polarity of said transmitted signal, and in same polarity from said one wire 1 it is induced in said other wire 2 and from it via said grounds return path $G_2$–$G_1$ of the given/apposite pair ends is coincided passed in the current direction $i_{G,2}$ to said load-network/equalizer (H)LN of a receive equipment R. The signal potential/current-directions in said direct $i_{1,2}$ and bypass $i_{1,G}$ and $i_{G,2}$ joint span paths is coincided and added. As a result the passband attenuation per unit length entered an existing pair of the existing/laying cables is getting several times as less of the currently in force excessive great universally known rated self-value and respectively is achieved the objective of the present invention: the several times as much passband, span length, etc., but without of adding of noises, interference and an excessive active attenuation equalization amplifiers now-necessarily by said currently in force excessive great universally known rated pair self-attenuation per unit length. By use of said extremely equalization of said load-reflecting equalizers in place of said usual load-matching networks the gain is respectively same more better.

Just so world's first has be reduced an already existing pair attenuation of an already existing/laying cables connected an already existing equipment and for the first time that is achieved by means of connecting up and using the external (frame) grounds $G_1$, $G_2$, an AC network, a pair shield, and even a metallic cable sheath. Mainly said introduced external grounds is connected up direct to the ground of and/or over the introduced insulating capacitor(s) to the power wire(s) of an AC network (power plug).

It is a mater of principle that at ends of said twin-wire lines span(s) can be independent connected up the equipment in/out as the coaxial or symmetrical.

Figure 2:
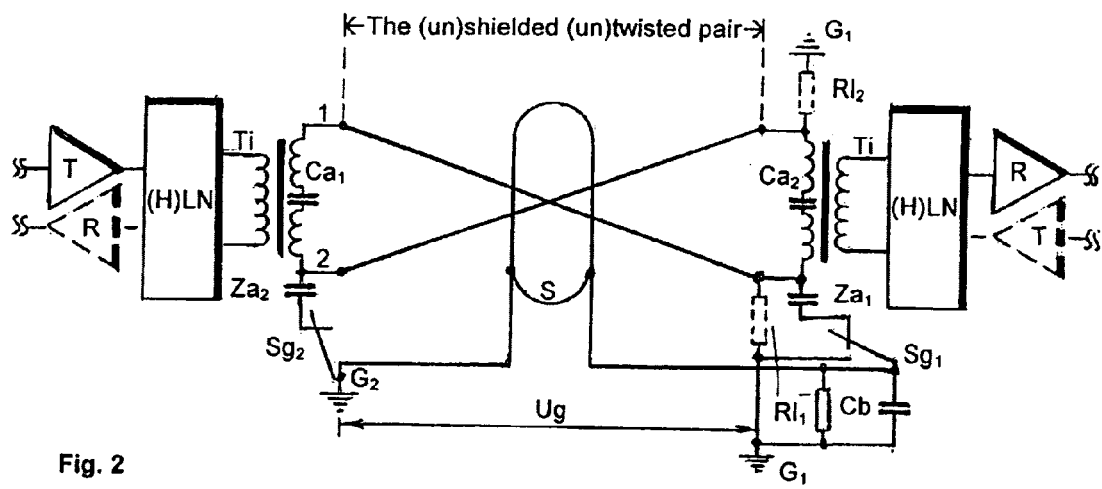
FIG. 2 is a block diagram of the adapting to a span length and of the suppressing of the ground current interference.

For all this, by means of the introduced ground cutout switches $Sg_1$, $Sg_2$ (FIG. 2) manual/automatic grounded the one from pair wires each at said improved apposite pair span(s) ends by said pair span length sufficient to the communicating with the given lower cutoff frequency rate and disconnected if short said length, and by means of the introduced adapting ground networks $Za_1$, $Za_2$ it is together/ separate adapt the ground impedance of said pair span(s) wires and in that way is achieved the transmission both as usual from zero-length, but with the augmented passband, and first with said reduced passband attenuation per unit length lower of the universally known rated self-attenuation of an used pair of the existing/laying cables. Until the line span is short and cannot be ground, its rated passband is several times augment by means of bring into use of the be in rated equalization of this ungrounded pair of the rated length range, while its augment passband and extend length is getting several times as much thus same rated equalization of this existing pair, but with said reduced attenuation per unit length, reduced thus said wires grounding.

The introduced insulating line transformer/s Ti formed for the passband attenuated/stopped, while the antihum $Ca_1$, $Ca_2$ and blocking Cb capacitors opened the direct currents circuits over said grounded wires 1 and 2 and separate/together protected the improved span(s) from a ground-potential difference Ug between said span end grounds $G_1$, $G_2$ and in this way suppressed the hum and low-frequency interference. By this the blocking capacitor Cb grounded the shield/metallic sheath S at said galvanic insulated span end protected said line/span(s) from the electromagnetic and radio frequency interference.

The introduced leakage/balancing resistor(s) $RI_1$, $RI_2$ balanced the wire leakage resistance at the pair span(s) end(s) and in that way make better the suppressing of hum, low-frequency, electromagnetic and radio frequency interference.

The introduced connecting/grounding of said grounded pair ends by (un)grounded said pair shield/metallic cable sheath S simplify the realization of said improved line/span(s).

The introduced low-frequency matching load matched said improved pair span(s) end(s) at low-frequencies and in that way equalized and increased the level of the low-frequency transmission.

Figure 3:
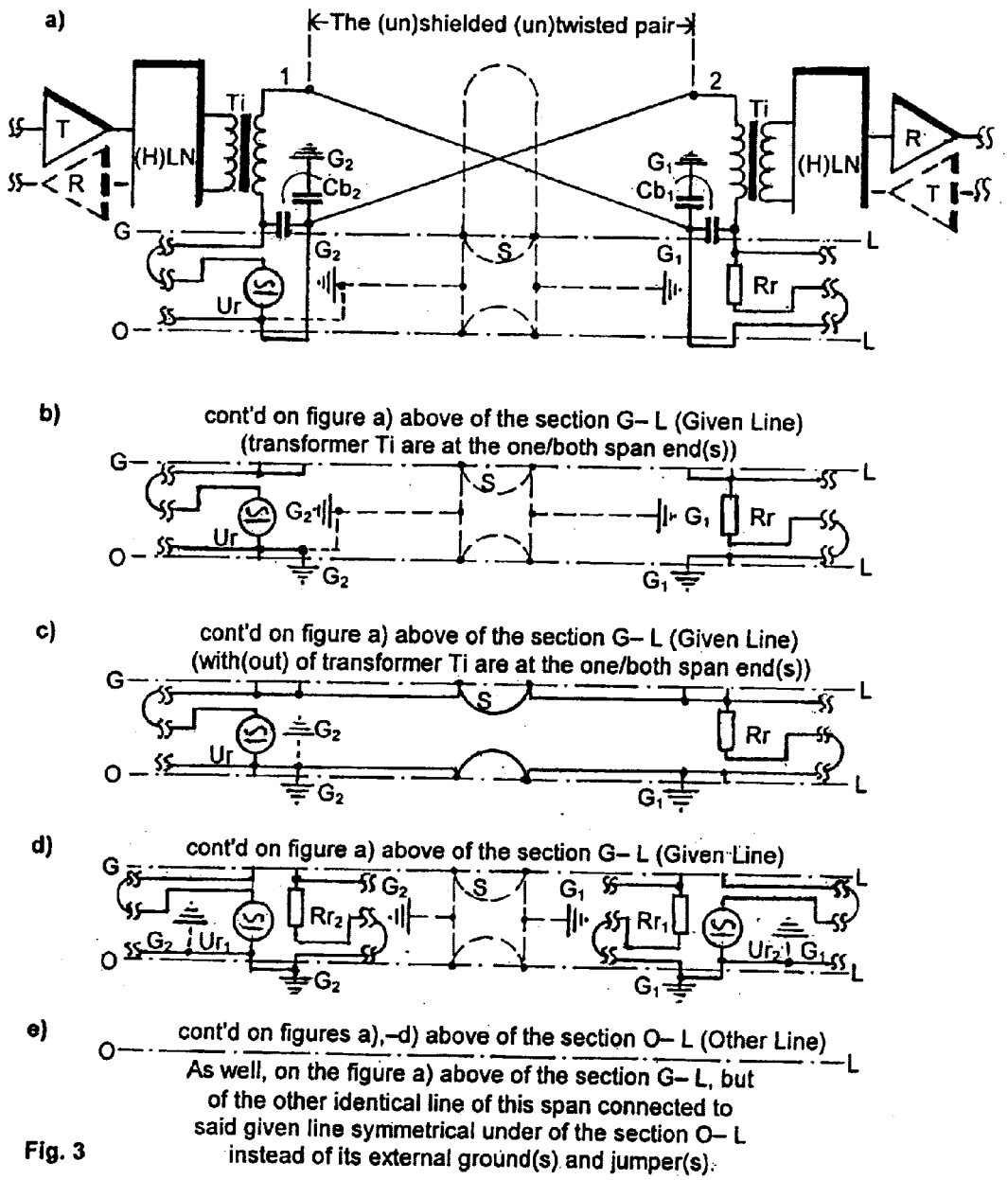
FIG. 3 is a block diagram of the remote power supply, ring, call, and control as:
  a) a series twin-wire phantom span path;
  b) a parallel twin-wire phantom span path;
  c) as well FIG. 3,*b*, shunted by a pair shield/sheath;
  d) the separate two phantom span paths the one are over the one 1 and the other are over the other 2 wires of a pair; and
  e) the two identical phantom span paths as well FIGS. 3,*a*,–*d* of two identical lines of this span.

Finally, the proposal remote power supply, ring, call, and control (FIG. 3) is accessed over the introduced galvanic phantom path(s) of the direct/alternate current and acted bypass said signal paths. The remote linked primary power supply/transmitter Ur and secondary power supply/their receiver Rr accessed over two series phantom paths each over the one from wires 1, 2 and the series to it insulating line coil of the one from transformers Ti (FIG. 3,a) and each this phantom path is a return path to the other. Or accessed over said two parallel connected phantom path (FIG. 3,a above the section G-L) and the common return path as parallel connected and/or said ground return path $G_1$–$G_2$, shield/sheath S, identical phantom path of the other identical line of this span (FIG. 3,b). Or accessed over said parallel phantom paths of the FIG. 3,b shunted by said shield/sheath S galvanic insulated from the ground (FIG. 3,c). Or accessed over said galvanic insulated shield/sheath S only and said return path(s). Or accessed as two separate identical remote phantom paths $Ur_1$-$Rr_1$, $Ur_2$-$Rr_2$ each over the one phantom paths from the Fir. 3,a and said return path(s). Or finally analogous accessed over two separate identical lines of this span (FIG. 3,e) and each line is a return pats to the other. Analogous in series/parallel accessed remote power supply, ring, call, and control of the other line span(s) (FIGS. 3,b,–e between the sections G-L and O-L). Said galvanic insulated phantom paths are grounded in the one point only as usual in common with said primary power supply Ur (FIGS. 3,a,–d between said sections, the dotted line to the ground). All said introduced phantom paths accessed bypass said signal paths and will not prevent line/span(s) from communicating, as they transmit/receive in the one/both directions.

Figure 4:
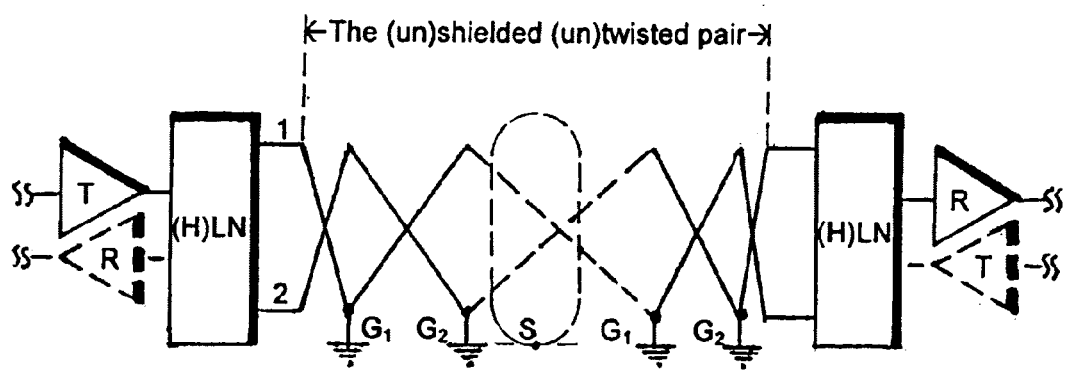
FIG. 4 is a schematic of the repeatedly in turn grounded pair wires of the twin-wire line span of the present invention.

In generally, by means of introduced grounds $G_1$, $G_2$, respectively at first the one wire 1, than with the step $G_1$–$G_2$ the other wire 2, etc. so repeatedly in turn again the next from the pair wires (FIG. 4), the signals has passed as usual over an usual pair span parts before and after said grounded pair span part(s), while inside/along this grounded paths first the signal has passed with the attenuation per unit length several times as less of the universally known rated pair self-attenuation, reduced by means of said introduced circuit(s)/path(s) Ca, . . . , $Z_E$ formed and accessed in the above described manner.

The introduced guided adaptive equalization of the systems' linear distortions of any pair of the different length of any shape, type, size/gauge of any cable type, category and what it is made of has modeled the methods of an approximation of the monotonous functions:

the monotonous front and top begin cut of the transient response of said pair entered by its systems' linear distortions and the overthrow by and monotonous top growing to the front entered for they equalization has approximated as the sum of exponents selected in the sign, relative level and time constant; or, that is the same, the monotonous frequency response cut of said pair with a rise of the frequency entered by its systems' linear distortions and its monotonous growing entered for its equalization has approximated by the broken line with the smooth-fractures selected with equal said sign, relative level, and the middle frequency as inversely proportional to said time constant with the weight $2\pi$.

Figure 5:
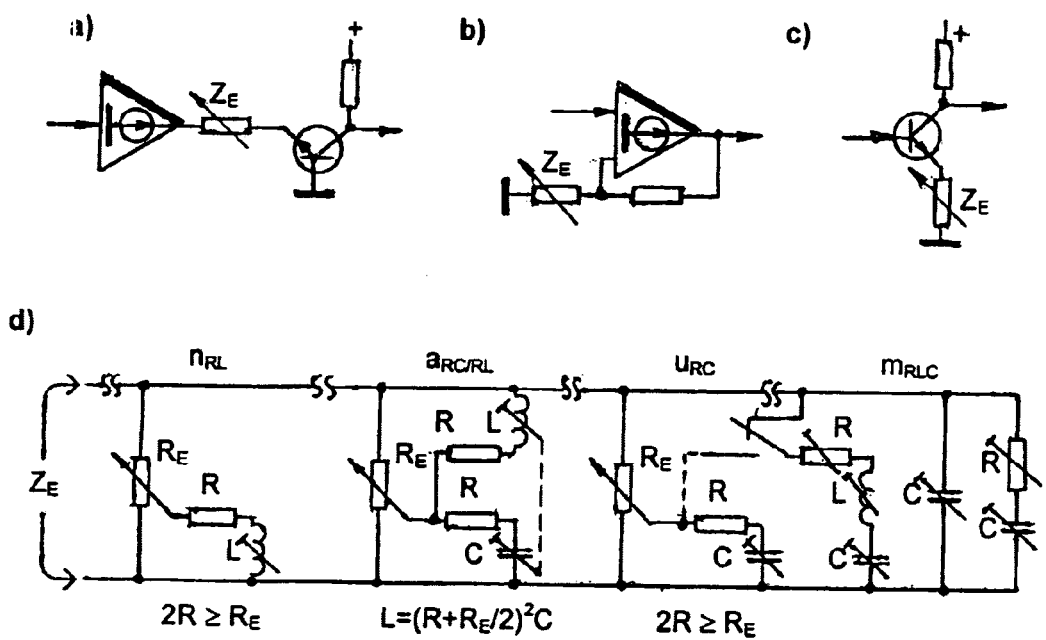
FIG. 5 is a schematic of the equalization of the systems' linear distortions of any pair of the different length of any shape, type, size/gauge of any cable type, category and what it is made of as:
  a) an equalizing divider of the direct coupling of the line equipment;
  b) an equalizing divider of the negative feedback of the line equipment;
  c) an equalizing negative feedback of the line equipment stage; and
  d) an adaptive equalizing two-pole network of FIGS. 5,*a*,–*c* in detail.

Said guided adaptive equalization has entered in the line equipment in its direct coupling divider (FIG. 5,a), negative feedback divider (FIG. 5,b), negative feedback of an amplifier stage (FIG. 5,c) consisting each said introduced guided adaptive equalizing two-pole network $Z_E$ (FIG. 5,d). In an extreme position when the equalization level control potentiometers $R_E$ short-circuited its controlled R-C or R-L equalizing circuit, and in the middle position by two R-C and R-L equalizing circuits the two-pole network impedance $Z_E$ is resistive and said equalization is not entered. Each from potentiometers $R_E$ in its branch of $Z_E$ guided of the relative level of its entered equalization in its own equalizing frequencies decade of the equalized passband. Its middle frequency determined by the time constant RC, or/and L/R of its equalizing R-C, or/and R-L circuit(s) guided by its own C, or/and L switch. Its R quantity determined the maximum relative level of its entered equalization. By term $2R \geq R_E$ the control of an equalization level entered by said potentiometer $R_E$ are practical not influenced on its entered equalizing frequencies/time constant.

Down of an equalizing frequencies decade until the capacitor C reactance modulus is $>\pi$ times as much of R, said R-C circuit (FIG. 5,d to the right) practical is cutout. Within of this decade with a rise of the frequency its reactance modulus is decreased from $\pi R$ up to $R/\pi$ and an impedance modulus of said R-C circuit is monotonous decreased from $\pi R$ up to R. Over of this decade its impedance is practical constant and equal R. Through said potentiometer $R_E$ with its entered weight by said R-C circuit has respectively shunted said equalizing two-pole network $Z_E$ and in this way is entered in the line equipment (as FIGS. 5,a,–c) a fide-up of the high-frequencies level within said equalizing frequencies decade of the passband are guided in the level by said potentiometer $R_E$ and in the middle frequency by said switched capacitor C. Analogous, said R-L circuit (FIG. 5,c on the left) has entered a fide-up of the low-frequencies of the passband, while compensated each other said two R-C and R-L circuits (ibid, in the middle) has positive/negative warped of the passband and each has analogous guided in its own equalizing frequencies decade. Down and over said equalizing frequencies decade all said circuits of the equalizing network $Z_E$ respectively cutout and entered said constant own resistive resistance R and therefore each branch of $Z_E$ has independent equalized its own frequencies decade of the passband systemic linear distortions, while within of each this decade its entered equalization has independent guided/adapted by said two adjusters only as: its potentiometer $R_E$ and C or/and L switch.

For an adapting of the equalization of the systems' linear distortions of any pair said equalizing two-pole network $Z_E$ comprises several R-C circuits equal to the decade number in an equalizing passband. For best equalizing at the rated high-frequency cutoff and to minimize in this way of the out-of-passband noises it is used the resonance equalizing R-L-C circuit shunted said potentiometers $R_E$ or guided together with said high-frequency R-C circuit (FIG. 5,c at the right). For decreasing of the equalization level with the reducing of the pair attenuation the resistance of $R_E$ and R of each next low-frequency R-C circuit is respectively as much. The general equalization increment with a growing of the frequency entered the capacitor(s) C connected up in parallel to said potentiometers $R_E$ (ibid). Said equalizing R-L circuit(s) has used mainly in said equalizing network $Z_E$ connected in other branch of said direct coupling/negative feedback of said line equipment. Said equalizing RC/RL-circuit(s) has used mainly for the total equalization of the multi-span line (and/or the other path(s)). Said equalization in said negative feedback (FIGS. 5,b, c) entered the gain equal of an equalized attenuation, and in this way entered the minimum possibilities noises, and in this sense is an optimum. The few adjusters of the proposed equalization has considerable simpler of the hundreds adjusters of the used transversal equalizers of the pair systems' linear distortions.

The test of the regular 24,000 feet (7.2 km) ADSL—Asymmetric Digital Subscriber Line over the 24 AWG (0.51 mm) unshielded twisted pair at both ends with the regular hybrid load-matching networks of the connected at both ends regular ADSL megabit modems by the proposed grounds at the apposite pair wire ends and nothing more in accordance with the present invention (the ground return path resistance 10 Ohm) display that:

the downstream (170–1,102 kHz) transmission date rate it is automatic increased from 384–416 kbps to as much as possible rated transmission data rate 7,552 kbps (currently achieved by the pair length only up to 10,000 feet) and the entered/equalized line attenuation it is respectively decreased by 2.2 times from as much as possible rated equalization rate 63.9 dB entered by the existing low-data rate and limited by it to 28.6–29.2 dB by the achieved 19 times as much data rate; and the upstream (25–138 kHz) transmission data rate it is automatic increased from 224 kbps to 352–416 kbps and the entered/equalized line attenuation it is respectively decreased by 1.45 times from 52.1–52.6 dB entered by existing low-data rate to 35.8–36.7 dB by the achieved average 1.7 times as much data rate.

The test result corroborate that in the present twin-wire line in accordance with the present invention the any already existing (un)shielded (un)twisted pair of any already existing/laying cables connected any already existing line equipment for the first time entered the passband attenuation per unit length at high-frequencies by 2.2 times as less than the currently in force excessive great universally known rated self-value, and by 1.45 times as less at low-frequencies. All this guarantee the achievement of an object of the present invention without of the re- and new-cabling and so the present improved twin-wire line become:

the axial line status of the new generation of the cable communications; and the axial super line status by using together with said extremely equalization of said load-reflecting equalizers at said pair span(s) end(s).

It will be understood that each of the elements described above, or two or more together, may also find a useful application in other types of constructions differing from the types described above.

While the invention has been described in connection with a preferred embodiment, this specification is not intended to limit the scope of the invention to the particular forms set forth, but on the contrary, it is intended to cover any such alternatives, modifications, and equivalents as may be included within the spirit and scope of the invention as defined by the appended claims.

What is claimed is:

1. Twin-wire line of cable communications, comprising:

a pair of wires for transmitting signals, one of said wires being grounded at one end of said pair, while the other wire is grounded at opposite end of said pair;

grounding means for grounding said wires at said ends; and an equipment connected to each of said ends of said pair and being an equipment selected from the group consisting of:

a symmetrical equipment grounded only by said-grounded wires of said pair; and a coaxial equipment having an inner wire and an outer wire, wherein said outer wire is grounded by said grounding means and grounds a respective one of said wires of said pair.

2. The twin-wire line of claim 1, wherein said grounding means include means selected from the group consisting of:

an adapting ground two-pole network connected between a ground and a respective one or said-grounded points of a respective one of said wires of said pair and including series capacitors shunted by R and R-C circuits;

a blocking capacitor connected between the ground and a respective one of said-grounded points of a respective one of said wires of said pair;

the ground utilizing an AC electrical power grid selected from the group consisting of ground and neutral wires end respective contacts of an AC electrical outlet connected directly and line wires and respective contacts of an AC electrical outlet connected each via an insulating capacitor;

an insulating line transformer connected at a respective end of said pair and protecting from external grounds;

an insulating line transformer having two coils connected in same polarity in series to wires of said pair;

a ground cutout switch connected between the ground and a respective one of said grounded points of a respective one of said wires of said pair;

a shield of said pair connecting said-grounded points of said wires of said pair;

a shield of said pair connects to said-grounded end of a respective one of said wires of said pair and being grounded and galvanically insulated from the ground by a blocking capacitor;

a shield of said pair connecting the grounds of said grounding means of said pair; and a metallic cable sheath of said pair connecting the grounds of said grounding means of said pair.

3. The twin-wire line of claim 1, and further comprising means for suppressing hum and low-frequency interference of a ground-potentials difference and being means selected from the group consisting of:

an anti-hum capacitor connected in series in a coil of an insulating line transformer at a protected end of said pair; and a shield of said pair connecting said-grounded points of said wires with said shield and said points being galvanically insulated from the ground along said pair and grounded in one point only.

4. The twin-wire line of claim 1, and further comprising circuits selected from the group consisting of:

a leakage-balancing resistor connected between the ground and one end of one of said wires of said pair;

a low-frequency terminating load with an impedance equal to an increment of characteristic impedance of said pair at low-frequencies including series resistors, shunted by C and R-C circuits and connected in series to a terminating resistor; and a load-reflecting equalizer connected as load of said pair and adaptively mismatching the connected end of said pair.

5. Twin-wire line of cable communications, comprising:

a pair of wires for transmitting signals, each having a first end connected to one equipment located at one end of said pair and a second end connected to another equipment located at opposite end of said pair and each grounded so that along said pair between first and last grounded points a grounded point in which one of said wires is grounded is located between two grounded points in which the other of said wires is grounded, and a distance between two neighboring grounded points along the pair is not less than one fourth of a lower pass frequency, and at least said first end of one of said wires and said second end of the other of said wires are grounded;

grounding means for grounding said wires; and said equipment connected to each of said ends of said pair and being an equipment selected from the group consisting of:

a symmetrical equipment grounded only by said-grounded wires of said pair; and a coaxial equipment having an inner wire and an outer wire, wherein said outer wire is grounded by said grounding means and grounds a respective one of said wires of said pair.

6. Twin-wire line of cable communications, comprising:

a pair of wires for transmitting signals being singly grounded in turn along said pair so that one of said wires is grounded after the ground of the other of said wires at intervals along the pair are not less than one fourth of a lower pass frequency;

grounding means for grounding said wires; and an equipment connected to each of said ends of said pair and being an equipment selected from the group consisting of:

a symmetrical equipment grounded only by said-grounded wires of said pair; and a coaxial equipment having an inner wire and an outer wire, wherein said outer wire is grounded by said grounding means and grounds a respective one of said wires of said pair.

7. Twin-wire line, comprising:

a pair of wires for transmitting signals, each having a first end connected to one equipment located at one end of said pair and a second end connected to another equipment located at opposite end of said pair and each grounded so that along said pair between first and last grounded points a grounded point in which one of said wires is grounded is located between two grounded points in which the other of said wires is grounded, and a distance between two neighboring grounded points along the pair is not less than one fourth of a lower pass frequency, and at least said first end of one of said wires and said second end of the other of said wires are grounded;

grounding means for grounding said wires in all said grounded points; and said equipment connected to each of said ends of said pair and being an equipment selected from the group consisting of:

a symmetrical equipment grounded only by said-grounded wires of said pair; and a coaxial equipment having an inner wire and an outer wire, wherein said outer wire is grounded by said grounding means and grounds a respective one of said wires of said pair;

wherein for multiplexing by a telephony and a remote power supply and control, further comprising a primary power supply and their transmitter and a secondary power supply and their receiver located at opposite ends of said pair, said respective wires of said pair being grounded by said grounding means selected from the group consisting of an adapting ground two-pole network and a blocking capacitor; said primary and secondary power supplies, said transmitter and said receiver being connected at a respective end of said pair at a location selected from the group consisting of:

between one of said grounded ends of a respective one of said wires of said pair and a coil of an insulating line transformer connected at said end of said pair;

between the ground and one of said grounded ends of a respective one of said wires of said pair connected with a coil of an insulating line transformer connected at said end of said pair;

between the ground and a shield of said pair connecting said grounded points of said wires with said shield and said points being galvanically insulated from the ground along said pair;

between the ground and one of said grounded end of a respective one of said wires at one end of said pair and between the ground and an end of a coil of an insulating line transformer located at opposite end of said pair and connected in series to said wire;

between the ground and an end of a shield of said pair which is galvanically insulated from the ground.

8. Twin-wire line, comprising:

a pair of wires for transmitting signals, each having a first end connected to one equipment located at one end of said pair and a second end connected to another equipment located at opposite end of said pair and each grounded so that along said pair between first and last grounded points a grounded point in which one of said wires is grounded is located between two grounded points in which the other of said wires a grounded, and a distance between two neighboring grounded points along the pair is not less than one fourth of a lower pass frequency, and at least said first end of one of said wires and said second end of the other of said wires are grounded;

grounding means for grounding said wires in all said grounded points; and said equipment connected to each of said ends of said pair and being an equipment selected from the group consisting of:
  a symmetrical equipment grounded only by said-grounded wires of said pair; and
  a coaxial equipment having an inner wire and an outer wire, wherein said outer wire is grounded by said grounding means and grounds a respective one of said wires of said pair;

comprising rate and reach extenders for upgrading of the pairs of cable communications and formed as a connector which is a separate unit including said means for grounding said wires.

9. Twin-wire line, comprising:

a pair of wires for transmitting signals, each having a first end connected to one equipment located at one end of said pair and a second end connected to another equipment located at opposite end of said pair and each grounded so that along said pair between first and last grounded points a grounded point in which one of said wires is grounded is located between two grounded points in which the other of said wires is grounded, and a distance between two neighboring grounded points along the pair is not less then one fourth of a lower pass frequency, and at least said first end of one of said wires and said second end of the other of said wires are grounded;

grounding means for grounding said wires in all said grounded points; and said equipment connected to each of said ends of said pair and being an equipment selected from the group consisting of:
  a symmetrical equipment grounded only by said-grounded wires or said pair; and
  a coaxial equipment having an inner wire and an outer wire, wherein said outer wire is grounded by said grounding means and grounds a respective one of said wires of said pair;

wherein said equipment connected at least at one of said ends of said pair includes an adaptive equalizing two-pole network for equalizing of systems' linear distortions of various types and various lengths of said pair connected in series in direct coupling while in negative feedback connected in parallel to it output and including a row of equalizing level control potentiometers connected in parallel, shunted by equalizing C and resonance R-L-C circuits and selected from the group consisting of:

one leg shunted by an equalizing series R-C circuit;

one leg shunted by an equalizing series R-L circuit;

one leg shunted by an equalizing series R-C circuit while another leg shunted by an equalizing series R-L circuit with equal resistors R and $L=(R+R_E/2)^2 C$, where $R_E$ is a resistance or the shunted potentiometer; and one leg shunted by both equalizing series R-C, and series resonance R-L-C circuits;

wherein said circuits being made as circuits selected from the group consisting of fixed, variable, switched and a combination thereof.

* * * * *